(12) United States Patent
Ziemer

(10) Patent No.: US 8,460,144 B2
(45) Date of Patent: Jun. 11, 2013

(54) ARRANGEMENT COMPRISING AT LEAST ONE DOG CLUTCH

(75) Inventor: Peter Ziemer, Tettnang (DE)

(73) Assignee: ZF Friedrichshafen, AG, Friedrichshafen (DE)

( * ) Notice: Subject to any disclaimer, the term of this patent is extended or adjusted under 35 U.S.C. 154(b) by 56 days.

(21) Appl. No.: 13/375,796

(22) PCT Filed: May 19, 2010

(86) PCT No.: PCT/EP2010/056906
§ 371 (c)(1),
(2), (4) Date: Dec. 2, 2011

(87) PCT Pub. No.: WO2010/139556
PCT Pub. Date: Dec. 9, 2010

(65) Prior Publication Data
US 2012/0083373 A1 Apr. 5, 2012

(30) Foreign Application Priority Data
Jun. 4, 2009 (DE) .......................... 10 2009 026 707

(51) Int. Cl.
F16H 31/00 (2006.01)

(52) U.S. Cl.
USPC .......................................... 475/146

(58) Field of Classification Search
None
See application file for complete search history.

(56) References Cited

U.S. PATENT DOCUMENTS

| 2,547,161 | A | * | 4/1951 | Johnson ........................ 475/295 |
| 3,444,972 | A | | 5/1969 | Carstensen et al. |
| 4,359,145 | A | | 11/1982 | Huff |
| 4,838,121 | A | * | 6/1989 | Takeshita et al. ............. 475/303 |
| 5,019,022 | A | | 5/1991 | Uhlig et al. |
| 5,667,330 | A | | 9/1997 | Henkel et al. |
| 5,679,096 | A | | 10/1997 | Stine et al. |
| 5,711,740 | A | * | 1/1998 | Bakowski ...................... 475/303 |
| 6,079,539 | A | | 6/2000 | Fetcho et al. |
| 6,131,686 | A | | 10/2000 | Scotti et al. |
| 6,196,944 | B1 | * | 3/2001 | Schmitz ....................... 475/303 |
| 7,198,143 | B2 | | 4/2007 | Legner |
| 7,278,942 | B2 | | 10/2007 | Klemen et al. |
| 7,331,894 | B2 | | 2/2008 | Sowul et al. |
| 7,357,235 | B2 | | 4/2008 | Schmidt et al. |
| 7,387,588 | B2 | * | 6/2008 | Bader ........................... 475/303 |
| 7,419,041 | B2 | | 9/2008 | Diemer et al. |
| 7,789,792 | B2 | | 9/2010 | Kamm et al. |
| 2006/0040782 | A1 | | 2/2006 | Diemer et al. |
| 2009/0163314 | A1 | | 6/2009 | Bock et al. |
| 2009/0301248 | A1 | | 12/2009 | Mohr et al. |
| 2010/0043586 | A1 | | 2/2010 | Mohr et al. |

FOREIGN PATENT DOCUMENTS

| CH | 304 821 | 1/1955 |
| DE | 634 500 | 12/1934 |
| DE | 866 290 | 7/1949 |
| DE | 1 550 769 | 7/1969 |
| DE | 2 316 560 | 10/1973 |
| DE | 2 246 123 | 3/1974 |

(Continued)

Primary Examiner — Dirk Wright
(74) Attorney, Agent, or Firm — Davis & Bujold, PLLC

(57) ABSTRACT

An arrangement which comprises at least one claw clutch for the shiftable coupling and decoupling of a shaft (1), in an automatic transmission of a planetary design, with at least one component. The shaft can be connected to a component of the planetary gearset (4) and the claw clutch is arranged centrally, substantially inside a sun gear (3) of the planetary gearset (4).

13 Claims, 5 Drawing Sheets

FOREIGN PATENT DOCUMENTS

| | | |
|---|---|---|
| DE | 39 28 133 A1 | 3/1990 |
| DE | 38 36 956 A1 | 5/1990 |
| DE | 199 01 414 A1 | 7/2000 |
| DE | 697 07 954 T2 | 6/2002 |
| DE | 102 29 515 A1 | 1/2004 |
| DE | 103 05 434 A1 | 7/2004 |
| DE | 103 34 450 A1 | 2/2005 |
| DE | 10 2005 035 156 A1 | 3/2006 |
| DE | 10 2005 037 402 A1 | 3/2006 |
| DE | 10 2005 038 925 A1 | 3/2006 |
| DE | 10 2005 002 337 A1 | 8/2006 |
| DE | 10 2006 022 176 A1 | 11/2007 |
| DE | 10 2006 049 274 A1 | 4/2008 |
| DE | 10 2006 049 281 A1 | 4/2008 |
| DE | 10 2008 010 064 A1 | 8/2009 |
| GB | 1 367 433 | 9/1974 |
| GB | 2 368 102 A | 4/2002 |
| WO | 2005/008096 A1 | 1/2005 |

* cited by examiner

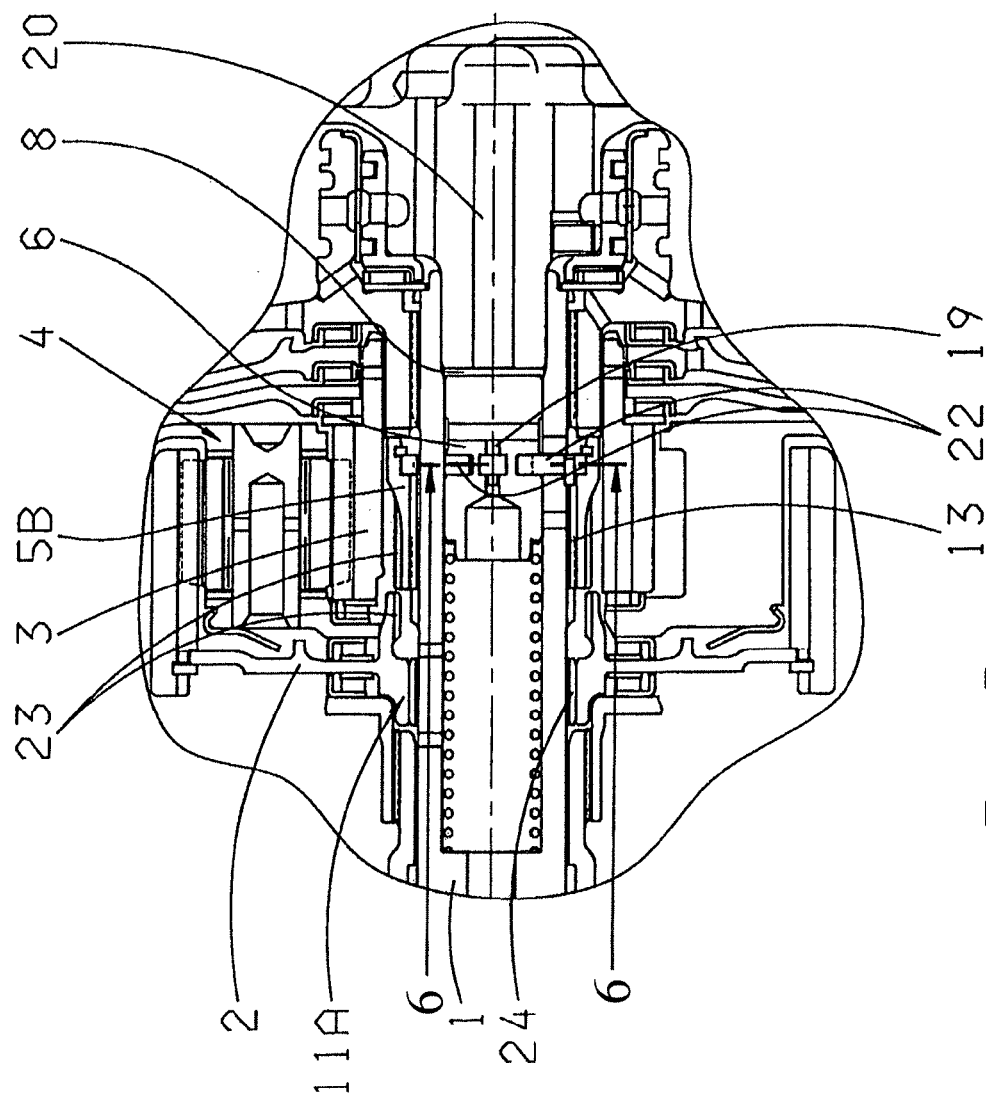

ARRANGEMENT COMPRISING AT LEAST ONE DOG CLUTCH

This application is a National Stage completion of PCT/EP2010/056906 filed May 19, 2010, which claims priority from German patent application serial no. 10 2009 026 707.7 filed Jun. 4, 2009.

FIELD OF THE INVENTION

The invention concerns an arrangement comprising at least one dog clutch.

BACKGROUND OF THE INVENTION

From automotive technology, arrangements comprising at least one dog clutch as a shifting element for connecting a shaft of a transmission to a component are known. For example, the document GB 2 368 102 describes an automatic transmission with a device for decoupling the transmission from a drive-train of a vehicle. The device is in the form of a dog clutch that is actuated hydraulically by an actuating piston, which is arranged inside a shaft. The actuating piston is acted upon on one side by pressure in order to be moved against the force of a restoring spring. To actuate the shifting claw a shifting finger coupled to the actuating piston is used, which passes through an opening in the shaft.

Furthermore, from the document U.S. Pat. No. 5,667,330 another arrangement with a dog clutch as a shifting element is known. In this known arrangement the dog clutch is used to connect a power take-off shaft to a transmission output shaft of a tractor. For this, an actuating piston on the inside of the output shaft is actuated hydraulically, so that the shifting claw is actuated by a bolt passing through an opening of the output shaft from the actuating piston to the shifting claw.

The document US2006/0040782A1 discloses a transmission arrangement with a dog clutch, which is actuated to one side by a piston and to the other side by a spring. In this case, the spring disadvantageously takes up additional fitting space.

SUMMARY OF THE INVENTION

The purpose of the present invention is to provide an arrangement for a dog clutch in an automatic transmission, which is as neutral as possible as regards fitting space.

Accordingly an arrangement is proposed, which comprises at least one dog clutch or the like for the shiftable coupling and decoupling of a drive input shaft in an automatic transmission of planetary design with at least one component of a planetary gearset, such that the dog clutch comprises a shifting claw and an actuating piston and is arranged centrally, substantially inside a sun gear of the planetary gearset. The shifting claw is arranged coaxially with the drive input shaft. The drive input shaft can be connected with a component of a planetary gearset. Furthermore, according to the invention the actuating piston is arranged inside the drive input shaft and can be actuated hydraulically in both movement directions, whereas the actuating piston can be controlled from one side only. In this way, the dog clutch can advantageously be located, in relation to its axial extension, to an extent inside the sun gear of the planetary gearset. Consequently a space-saving arrangement is produced since the dog clutch is, as it were, integrated in the planetary gearset.

Moreover it is actuated hydraulically in both directions, so that in an advantageous manner no additional control element such as restoring springs are needed. In an advantageous design of the invention, as the component of the planetary gearset a ring gear can be coupled to the shifting claw and hence to the drive input shaft of suchlike. However, other components of the planetary gearset as well can be shifted by the shifting claw.

Preferably, for supplying the pressure medium a tube or the like can be pressed into a cover fixed on the housing and can pass through the actuating piston into the bore of the drive input shaft provided as the cylinder space for the actuating piston, in order to act upon the actuating piston with pressure medium for opening the shifting claw. To close the shifting claw, in a design version of the invention at least one pressure medium feed duct located in the cover fixed to the housing can be provided, which delivers the pressure medium into the bore of the drive input shaft forming the cylinder space for the actuating piston. Other designs for the hydraulic action of the shifting claw or actuating piston are also possible.

Preferably, a clearance fit can be provided between the inside diameter of the bore in the drive input shaft and the outer diameter of the actuating piston. In this way, on the one hand the actuating piston can move freely and on the other hand a seal ins provided between the pressure medium flows for closing and opening the shifting claw, i.e. for coupling and decoupling the drive input shaft and the planetary gearset component.

In this version it can preferably be provided that the shifting claw is actuated by at least one bolt or the like projecting through the drive input shaft, which is connected or coupled to the actuating piston. Other ways to actuate the shifting claw are also possible.

Another embodiment variant for actuating the shifting claw can provide that the actuating piston is coupled to the shifting claw by means of a plurality of drive-tabs that project radially through the drive input shaft in order to move it axially. For example, the drive-tabs can form as it were an armature sheet or suchlike, whose radial carrier is formed by the drive-tabs. Preferably, a plurality of drive-tabs distributed at the circumference at a predetermined angle to one another are provided. In this way a planar contact can be obtained both on the shifting claw and also on the actuating piston, so that tilting or jamming is reliably avoided.

Regardless of the embodiment variant concerned, the shifting claw and its corresponding counterpart on the component to be shifted can be connected, for example, by co-operating crown gearing or even co-operating spline gearing or the like.

In one possible embodiment variant of the invention it can be provided that the dog clutch comprises an actuating piston formed as a shifting claw. In this way two components are integrated in a combined component. Thereby, more fitting space can be saved. For sealing, owing to the small axial forces, rectangular rings can advantageously be used on the inside and outside. However, sealing can also be done, for example, with O-rings or the like. Moreover, sealing is also possible even without a sealing element by virtue of a very small clearance fit between the surfaces brought together.

In an advantageous further development, the crown or spline gearing of the shifting claw halves can be made cambered and/or conical or with an undercut and/or at the front end with a chamfer or a radius and/or with a centering cone.

It is also possible for the shifting claw to be connected in a rotationally fixed manner with a drive input shaft by spline gearing, and thus also to be centered. The corresponding counterpart of the shifting claw, for example on the ring gear of the planetary gearset, is preferably mounted on the drive input shaft by a slide bearing or the like.

In an advantageous embodiment variant, in the arrangement according to the invention it can be provided that to damp the shifting movement of the shifting claw at least one piston or the like is arranged essentially inside the drive input shaft as a pressure relief valve with a restoring spring. To be able to damp the impact when a tooth-on-tooth position occurs between the gearing on the shifting claw and on its corresponding counterpart, the pressure surge can be attenuated by the pressure relief valve. For this, for example the piston can be returned by a spring more powerful than the restoring spring of the actuating piston. By virtue of the stroke movement of the piston, the pressure medium build-up produced by the tooth-on-tooth position can be absorbed. In the case of a tooth-on-gap position this pressure medium fraction can then advantageously be used again for the rapid filling of the cylinder space of the actuating piston. Optionally, a bore can be provided, though which excess oil can flow away during the movement of the internal piston.

A further design of the present invention can provide that the shifting claw is coaxial with the drive input shaft, in contact against its outer circumference, whereas the actuating piston is preferably arranged inside the drive input shaft, for example in a bore or the like.

BRIEF DESCRIPTION OF THE DRAWINGS

Below, the present invention is explained in more detail with reference to the drawings, which show:

FIG. 5: A schematic, sectioned partial view of a fifth embodiment variant of the arrangement;

FIG. 6: A sectioned partial view along the section line 6-6 in FIG. 5;

DETAILED DESCRIPTION OF THE PREFERRED EMBODIMENTS

The figures show various embodiments of an arrangement according to the invention with a dog clutch for the shiftable coupling and decoupling of a drive input shaft 1 in an automatic transmission of planetary design with at least one component of the planetary gearset 4, wherein, as the component, in all the embodiment variants shown a ring gear 2 of the planetary gearset 4 is used as an example, this being connected with the drive input shaft 1 by means of the dog clutch. In the various figures the same components are denoted by the same indexes.

Regardless of the embodiment variant concerned, according to the invention it is provided that the dog clutch is arranged centrally, substantially inside a sun gear 3 of the planetary gearset 4 in order to achieve an arrangement of the dog clutch in the automatic transmission that is neutral in terms of fitting space.

Figure 1:
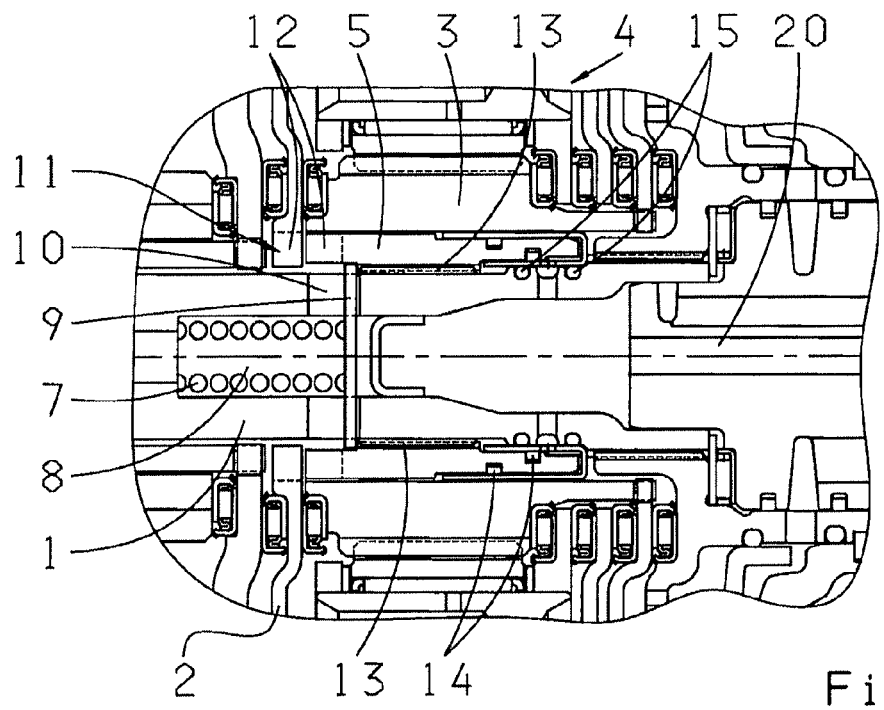
FIG. 1: A schematic, sectioned partial view of a first possible embodiment variant of an arrangement according to the invention with a dog clutch in an automatic transmission of planetary design.

In the first and second embodiment variants shown in FIGS. 1 and 2 the shifting claw 5 and the actuating piston 6 are made as a combined component which is denoted by the index of the shifting claw 5 and will be referred to below just as the shifting claw 5. The shifting claw 5 is arranged coaxially with the drive input shaft 1 and is in contact with the outer circumference of the drive input shaft 1. In order to be moved in the axial direction for coupling and decoupling the drive input shaft with the ring gear 2 of the planetary gearset 4, a cylindrical space is provided between the drive input shaft 1 and the sun gear 3, which is pressurized with pressure medium.

To return the combined component, in the first embodiment variant a restoring spring 7 is arranged in a bore 8 inside the drive input shaft 1. On the restoring spring 7 is provided a drive-plate 9, which projects in the radial direction through one or more openings in the drive input shaft 1 in order to return the shifting claw 5. The opening in the drive input shaft 1 is made as a slot 10. The shifting claw 5 and its corresponding counterpart 11 on the ring gear 2 have co-operating crown teeth 12. The shifting claw 5 is centered on the drive input shaft 1 by co-operating splines 13 and is thereby connected to it in a rotationally fixed manner but axially movably.

In both the first and the second embodiment variants the shifting claw 5 is sealed on the inside and outside by means of rectangular ring seals 14 and O-ring seals 15, due to the small axial forces involved.

Figure 2:
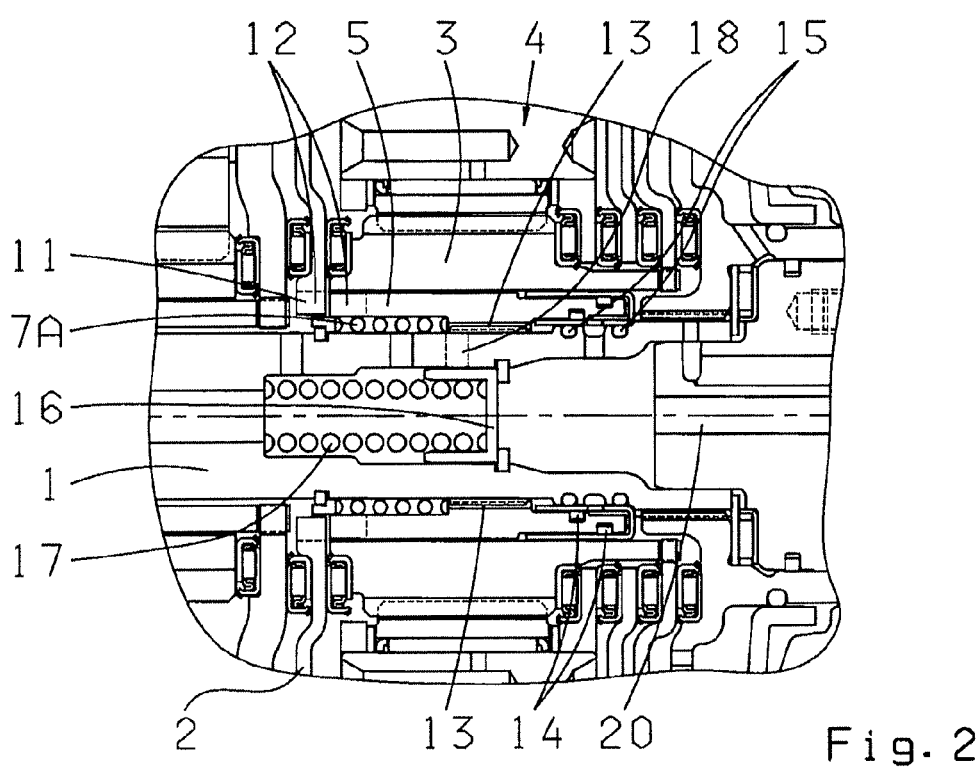
FIG. 2: A schematic, sectioned partial view of a second embodiment variant of the arrangement.

In contrast to the first embodiment variant, in the second embodiment variant shown in FIG. 2 the restoring spring 7A is arranged outside the drive input shaft 1 between the shifting claw 5 and the drive input shaft 1. Moreover, in the second embodiment variant a further piston 16 is provided as a pressure relief valve, in order to damp an impact produced if a tooth-on-tooth position occurs at the shifting claw when it is engaged. The piston 16 is arranged inside the drive input shaft 1 and is returned by a spring 17 which is more powerful than the restoring spring 7A. By virtue of the stroke movement of the piston 16, the build-up of pressure medium occurring in a tooth-on-tooth position is absorbed. When a tooth-on-gap position of the shifting claw 5 is finally reached, this pressure medium fraction can be used again for rapid filling, for the farther movement of the shifting claw 5. Optionally, a bore 18 indicated by a broken line in FIG. 2 can be provided, through which the excess pressure medium can flow away during the movement of the piston 16.

As in the first embodiment variant, so too in the second one a cylindrical space is formed between the drive input shaft 1 and the sun gear 3, which is pressurized with pressure medium to actuate the shifting claw 5.

Figure 3:
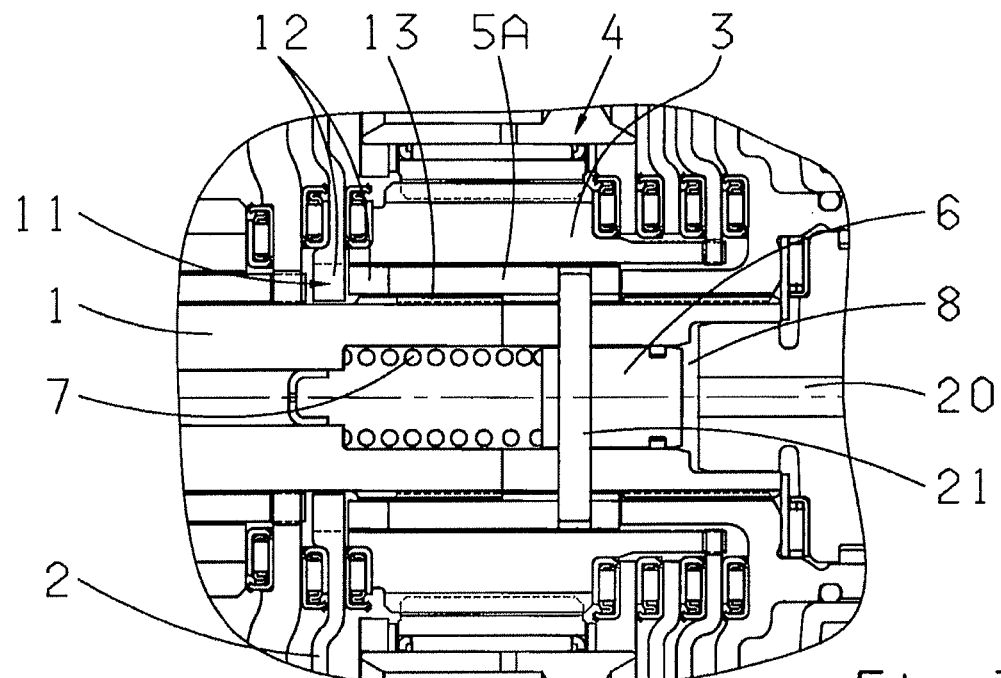
FIG. 3: A schematic, sectioned partial view of a third embodiment variant of the arrangement.

FIG. 3 shows a third possible embodiment variant of the arrangement according to the invention. In this case the shifting claw 5A and the actuating piston 6 are made as separate components. The actuating piston 6 is arranged to move axially in a bore 8 inside the drive input shaft 1. To actuate the actuating piston 6 pressure medium is admitted through a pressure medium feed duct 20, in order to act upon the actuating piston 6 with pressure medium and cause it to move to the left in the plane of the drawing, against the spring force of the restoring spring 7. To transmit the movement of the actuating piston 6 to the shifting claw 5A a bolt 21 is provided, which projects through two preferably circular openings and is connected to the shifting claw 5A.

Figure 4:
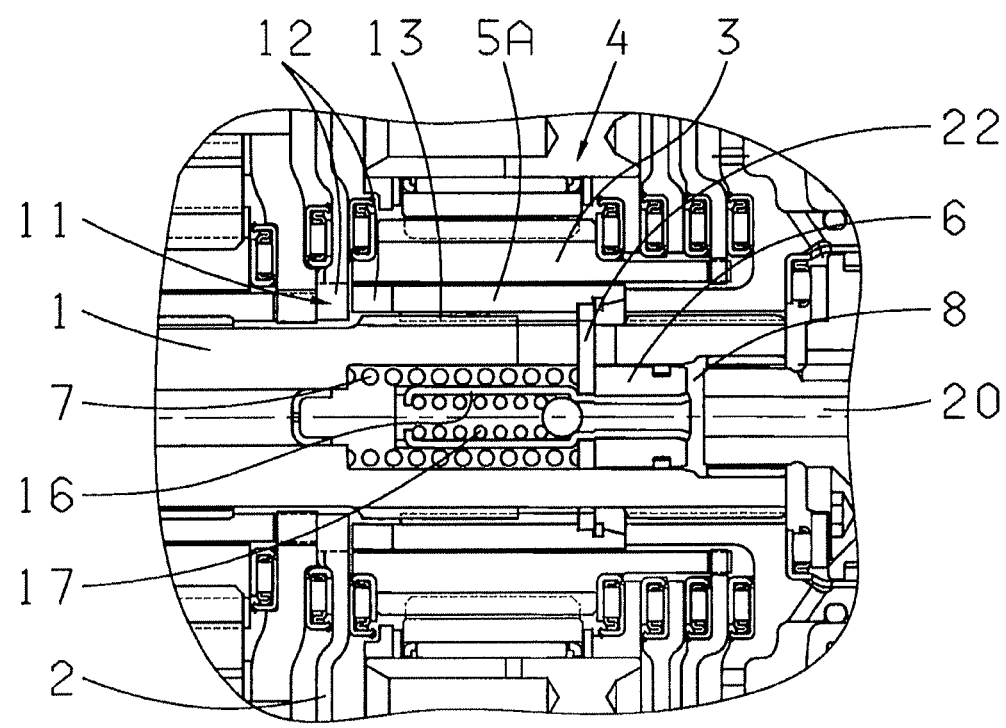
FIG. 4: A schematic, sectioned partial view of a fourth embodiment variant of the arrangement.

FIG. 4 shows a fourth possible embodiment variant of the arrangement according to the invention, which is designed analogously to the third embodiment variant in FIG. 3 but in which the movement of the actuating piston is transmitted by three drive-tabs 22 and in which, however, a pressure relief valve is additionally used, whose function is comparable to that of the additional piston 16 in the second embodiment variant shown in FIG. 2, so that reference can be made to the description of FIG. 2.

A fifth embodiment variant of the proposed arrangement is shown in FIGS. 5 and 6. This fifth embodiment variant is comparable to the third embodiment variant shown in FIG. 3, but the movement of the actuating piston 6 is transmitted as in FIG. 4 by three drive-tabs 22, which avoids any tilting or jamming. In the fifth embodiment variant the shifting claw 5B and the corresponding counterpart 11A on the ring gear 2 have co-operating splines 23. The counterpart 11A on the ring gear 2 is mounted on the drive input shaft 1 by means of a slide bearing 24. The shifting claw 5B is connected in a rotationally fixed manner to the drive input shaft 1 and centered on it by co-operating splines 13.

FIG. 6 shows a sectioned partial view along the section line A in FIG. 5, which makes clear the approximately armature-shaped configuration of the drive-tabs 22. Owing to the design form of the drive-tabs 22 there is, as it were, planar contact against both the shifting claw 5B and the actuating piston 6. A lubrication oil duct 19 for supplying lubrication oil is arranged inside the actuating piston 6.

Figures 7, 8:
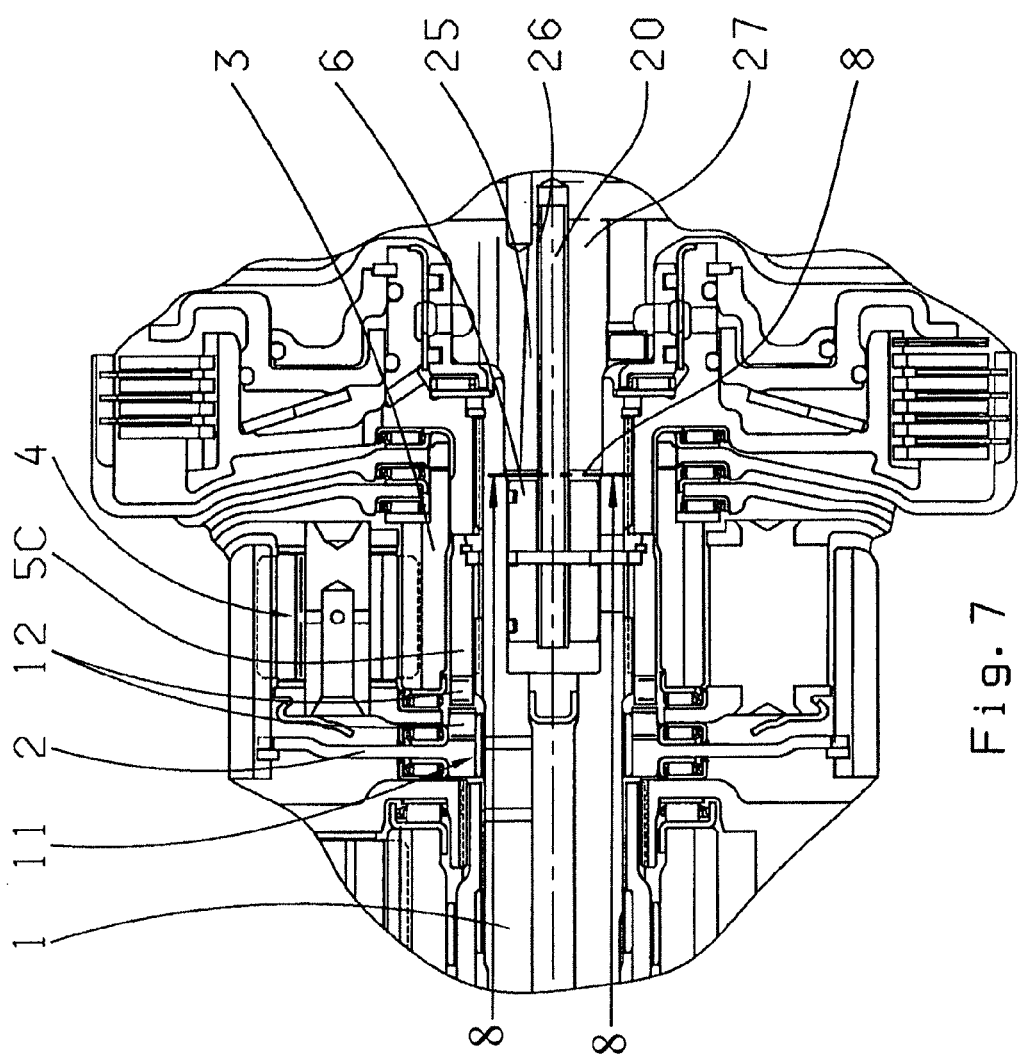
FIG. 7: A schematic, sectioned partial view of a sixth embodiment variant of the arrangement.
FIG. 8: A sectioned partial view along the section line 8-8 in FIG. 7.

FIG. 7 shows a sixth embodiment variant of the arrangement. In this case there is no restoring spring since the actuating piston 6 can be actuated hydraulically in both movement directions. However, it is controlled from one side only. For this, a tube 26 is pressed into a cover 27 fixed on the housing. The tube 26 is so arranged that it passes through the actuating piston 6 and delivers pressure medium into the bore 8 of the drive input shaft 1 on the left-hand side of the actuating piston 6 in the plane of the drawing so that, when acted upon by pressure, the actuating piston 6 moves to the right in the drawing plane in order thereby to bring the shifting claw 5C to its open or decoupled position. In addition, further feed ducts 25 are provided in the cover 27, which deliver pressure medium into the bore 8 of the drive input shaft 1 on the right-hand side of the actuating piston 6 in the drawing plane, so that when pressurized the actuating piston 6 moves to the left in the drawing plane, whereby the shifting claw 5C is brought to its closed or coupled position.

FIG. 8 shows a sectioned partial view along the section line B in FIG. 7. This view makes it clear that three feed ducts 25 are provided in the cover 27, through which the right-hand side of the actuating piston 6 can be acted upon by pressure medium in order to close the shifting claw 5C. The feed ducts 25 are preferably arranged at angular intervals of 120° apart from one another.

Figure 9:
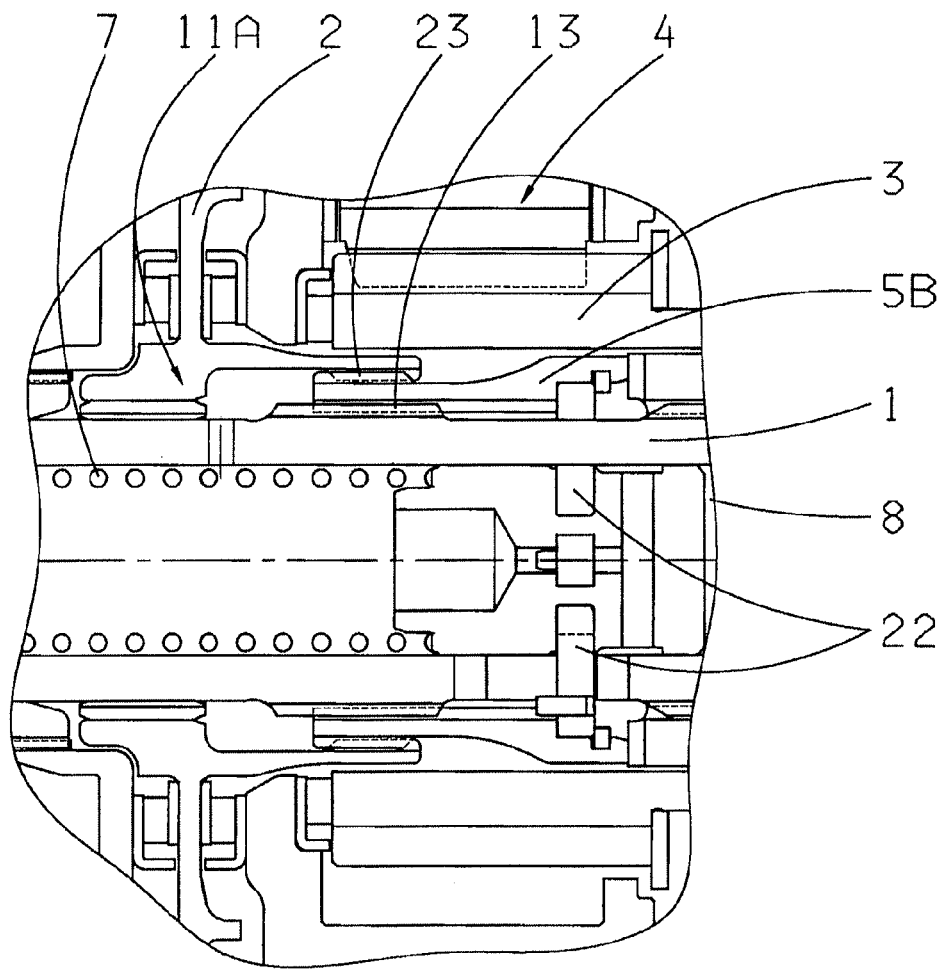
FIG. 9: A schematic, sectioned partial view of a seventh embodiment variant of the arrangement.

Finally, FIG. 9 shows a seventh embodiment variant in which the actuating piston is arranged in the bore of the drive input shaft 1 and can be moved hydraulically against the force of a restoring spring 7. The shifting claw 5B and its corresponding counterpart 11A are made, as in the fifth embodiment variant shown in FIG. 5, with co-operating splines 23. In contrast, however, in this seventh embodiment variant the dog clutch is of the "normally closed" type. This means that when the shifting claw 5B is not pressurized, it is in its closed or coupled position. As soon as the actuating piston 6 is acted upon by pressure, the shifting claw 5B is opened or decoupled from its counterpart 11A.

In all the embodiment variants except for the seventh one shown in FIG. 9, the shifting claw is shown in its open or decoupled position. In FIG. 9 the shifting claw 5B is shown in its closed or coupled position.

INDEXES

1 Drive input shaft, shaft
2 Ring gear
3 Sun gear
4 Planetary gearset
5 Shifting claw
5A Shifting claw
5B Shifting claw
5C Shifting claw
6 Actuating piston
7 Restoring spring
7A Restoring spring
8 Bore
9 Drive-plate
10 Slot
11 Counterpart component
11A Counterpart component
12 Crown gearing
13 Spline gearing
14 Rectangular ring seals
15 O-ring seals
16 Piston
17 Spring
18 Bore
19 Lubrication oil duct
20 Feed duct
21 Bolt
22 Drive-tab
23 Spline gearing
24 Slide bearing
25 Feed duct
26 Tube
27 Cover

The invention claimed is:

1. An arrangement for shiftable coupling and decoupling of a drive input shaft (1) of an automatic transmission of a planetary design with at least one component of a planetary gearset (4) via at least one claw clutch comprising a shifting claw (5) and an actuating piston (6),
   the claw clutch being substantially centrally arranged inside a sun gear (3) of the planetary gearset (4),
   the shifting claw (5A, 5B, 5C) being arranged coaxially with the drive input shaft (1),
   the actuating piston (6) being arranged inside the drive input shaft (1) and being actuatable hydraulically in both movement directions, whereas the actuating piston (6) being controlled only from one side.

2. The arrangement according to claim 1, wherein the drive input shaft (1) is connected to a ring gear (2) of the planetary gearset (4) in a shiftable manner.

3. The arrangement according to claim 1, wherein a tube (26) is pressed into a cover (27), fixed on a housing, for supplying pressure medium and the tube (26) extends through the actuating piston (6) into a bore (8) of the drive input shaft (1) provided as a cylinder space for the actuating piston (6), for pressurizing the actuating piston (6) with the pressure medium for disengaging the shifting claw (5C).

4. The arrangement according to claim 1, wherein a cover (27) is fixed to a housing and comprises at least one pressure medium feed duct (25) which passes into a bore (8) of the drive input shaft (1), provided as a cylindrical space for the actuating piston (6), for acting upon the actuating piston (6) and engaging the shifting claw (5C).

5. The arrangement according to claim 3, wherein a clearance fit is provided, in the drive input shaft (1), between an inside diameter of the bore (8) and an outer diameter of the actuating piston (6).

6. The arrangement according to claim 1, wherein the shifting claw (5A) is actuatable by at least one bolt (21) of the actuating piston (6) that projects through the drive input shaft (1).

7. The arrangement according to claim 1, wherein the actuating piston (6) is coupled, via a plurality of drive-tabs (22) that project radially through the drive input shaft (1), to the shifting claw (5B) for moving the latter axially.

8. The arrangement according to claim 1, wherein the shifting claw (5, 5A, 5C) and a corresponding counterpart (11) on a ring gear (2) to be shifted are connectable by a cooperating crown gearing (12).

9. The arrangement according to claim 1, wherein the shifting claw (5B) and a corresponding counterpart (11A) on a ring gear (2) to be shifted are connectable by a cooperating spline gearing (23).

10. The arrangement according to claim 8, wherein the crown gearing (12) or a spline gearing (23) has at least one of a camber, a conical design, an undercut, a front-end bevel, a front-end radius and a centering cone.

11. The arrangement according to claim 1, wherein the shifting claw (5, 5A, 5B, 5C) is connected, in a rotationally fixed manner, to the drive input shaft (1) by a spline gearing (13).

12. The arrangement according to claim 1, wherein at least one piston (16) with a restoring spring (17) is arranged inside the drive input shaft (1) as a pressure relief valve for damping the shifting movement of the shifting claw (5, 5A).

13. An arrangement for shiftable coupling and decoupling of a drive input shaft (1) of an automatic transmission of planetary design with at least one component of a planetary gearset (4), the arrangement comprising:

at least one claw clutch comprising a shifting claw (5) and an actuating piston (6), the at least one claw clutch being substantially centrally arranged within a sun gear (3) of the planetary gearset (4), the shifting claw (5A, 5B, 5C) being coaxially supported by the drive input shaft (1), the actuating piston (6) being arranged inside the drive input shaft (1) and being hydraulically actuatable in both axial directions of movement, and the actuating piston (6) only being controlled from one axial side.

* * * * *